(12) United States Patent
Gu et al.

(10) Patent No.: US 9,756,346 B2
(45) Date of Patent: Sep. 5, 2017

(54) EDGE-SELECTIVE INTRA CODING

(71) Applicant: Google Inc., Mountain View, CA (US)

(72) Inventors: Qunshan Gu, Hayward, CA (US); Yaowu Xu, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/873,688

(22) Filed: Oct. 2, 2015

(65) Prior Publication Data

US 2016/0029034 A1    Jan. 28, 2016

Related U.S. Application Data

(62) Division of application No. 13/647,080, filed on Oct. 8, 2012, now abandoned.

(51) Int. Cl.
*H04N 7/00* (2011.01)
*H04N 19/176* (2014.01)
(Continued)

(52) U.S. Cl.
CPC ........... *H04N 19/176* (2014.11); *H04N 19/11* (2014.11); *H04N 19/14* (2014.11)

(58) Field of Classification Search
CPC .. H04N 7/50; H04N 7/26244; H04N 7/26271; H04N 7/26015; H04N 7/26031
See application file for complete search history.

(56) References Cited

U.S. PATENT DOCUMENTS

| 5,148,269 A | 9/1992 | de Haan et al. |
| 5,150,209 A | 9/1992 | Baker et al. |

(Continued)

FOREIGN PATENT DOCUMENTS

| EP | 0634873 A2 | 1/1995 |
| EP | 1903698 A2 | 3/2008 |
| WO | WO2011065735 A2 | 6/2011 |

OTHER PUBLICATIONS

Wiegand et al. (WD1: Working Draft 1 of High-Efficiency Video Coding; Oct. 2010.*

(Continued)

*Primary Examiner* — Frank Huang
(74) *Attorney, Agent, or Firm* — Young Basile Hanlon & MacFarlane, P.C.

(57) ABSTRACT

Edge-selective intra coding may include encoding a first input block, generating a first reconstructed block by decoding the first encoded block, determining a reconstruction error block based on a difference between the first input block and the first reconstructed block, identifying a second input block from the first input frame, and determining a plurality of refined context pixels. Determining a plurality of refined context pixels may include identifying a plurality of context pixels from the reconstruction error block, generating a plurality of encoded context pixels by encoding the plurality of context pixels, generating a plurality of reconstructed context pixels by decoding the plurality of encoded context pixels, and adding at least a portion of the reconstruction error block and the plurality of reconstructed context pixels. The method may include generating a second encoded block by encoding the second input block based on the plurality of refined context pixels.

20 Claims, 7 Drawing Sheets

(51) Int. Cl.
*H04N 19/11* (2014.01)
*H04N 19/14* (2014.01)

(56) References Cited

U.S. PATENT DOCUMENTS

| | | | |
|---|---|---|---|
| 5,337,086 | A | 8/1994 | Fujinami |
| 5,398,068 | A | 3/1995 | Liu et al. |
| 5,512,952 | A | 4/1996 | Iwamura |
| 5,708,473 | A | 1/1998 | Mead |
| 5,731,840 | A | 3/1998 | Kikuchi et al. |
| 5,861,921 | A | 1/1999 | Shimizu et al. |
| 5,886,742 | A | 3/1999 | Hibi et al. |
| 5,991,447 | A | 11/1999 | Eifrig et al. |
| 6,005,980 | A | 12/1999 | Eifrig et al. |
| 6,272,179 | B1 | 8/2001 | Kadono |
| 6,289,049 | B1 | 9/2001 | Kim et al. |
| 6,314,208 | B1 | 11/2001 | Konstantinides et al. |
| 6,349,154 | B1 | 2/2002 | Kleihorst |
| 6,359,929 | B1 | 3/2002 | Boon |
| 6,363,119 | B1 | 3/2002 | Oami |
| 6,381,277 | B1 | 4/2002 | Chun et al. |
| 6,650,704 | B1 | 11/2003 | Carlson et al. |
| 6,654,419 | B1 | 11/2003 | Sriram et al. |
| 6,711,211 | B1 | 3/2004 | Lainema |
| 6,735,249 | B1 | 5/2004 | Karczewicz et al. |
| 6,907,079 | B2 | 6/2005 | Gomila et al. |
| 7,158,681 | B2 | 1/2007 | Persiantsev |
| 7,277,587 | B2 | 10/2007 | Sun |
| 7,333,544 | B2 | 2/2008 | Kim et al. |
| 7,602,851 | B2 | 10/2009 | Lee et al. |
| 7,602,997 | B2 | 10/2009 | Young |
| 7,689,051 | B2 | 3/2010 | Mukerjee |
| 7,983,338 | B2 | 7/2011 | Takamura et al. |
| 9,210,432 | B2 | 12/2015 | Gu et al. |
| 2002/0031272 | A1 | 3/2002 | Bagni et al. |
| 2003/0202705 | A1 | 10/2003 | Sun |
| 2005/0265444 | A1 | 12/2005 | Kim |
| 2007/0019729 | A1 | 1/2007 | Nakagomi et al. |
| 2007/0065026 | A1 | 3/2007 | Lee et al. |
| 2007/0110327 | A1 | 5/2007 | Han |
| 2008/0123747 | A1 | 5/2008 | Lee et al. |
| 2008/0152008 | A1 | 6/2008 | Sun et al. |
| 2008/0181299 | A1 | 7/2008 | Tian et al. |
| 2008/0192821 | A1 | 8/2008 | Malayath et al. |
| 2008/0211901 | A1 | 9/2008 | Civanlar et al. |
| 2009/0190660 | A1 | 7/2009 | Kusakabe et al. |
| 2009/0284651 | A1 | 11/2009 | Srinivasan |
| 2010/0086028 | A1 | 4/2010 | Tanizawa et al. |
| 2010/0104021 | A1 | 4/2010 | Schmit |
| 2010/0118945 | A1 | 5/2010 | Wada et al. |
| 2010/0177819 | A1 | 7/2010 | Jeon et al. |
| 2010/0194910 | A1 | 8/2010 | Matsuo et al. |
| 2010/0226436 | A1 | 9/2010 | Dane et al. |
| 2011/0026591 | A1 | 2/2011 | Bauza et al. |
| 2011/0052087 | A1 | 3/2011 | Mukherjee |
| 2011/0235706 | A1 | 9/2011 | Demircin et al. |
| 2011/0243229 | A1 | 10/2011 | Kim et al. |
| 2012/0307890 | A1 | 12/2012 | Lu et al. |
| 2012/0307906 | A1 | 12/2012 | Kim et al. |
| 2013/0077671 | A1 | 3/2013 | Tanaka |
| 2013/0077696 | A1 | 3/2013 | Zhou |
| 2014/0098854 | A1 | 4/2014 | Gu et al. |
| 2014/0098855 | A1 | 4/2014 | Gu et al. |
| 2014/0098856 | A1 | 4/2014 | Gu et al. |
| 2014/0226715 | A1 | 8/2014 | Sato |
| 2015/0110408 | A1 | 4/2015 | Wang et al. |

OTHER PUBLICATIONS

Laroche et al. "RD Optimized Coding for Motion Vector Predictor Selection" IEEE Transactions on Circuits and Systems for Video Technology, vol. 18, No. 9, Sep. 2008.*

Bankoski et al. "Technical Overview of VP8, An Open Source Video CODEC for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.

Ebrahimi, Touradj, et al.; "Joint motion estimation and segmentation for very low bitrate video coding", SPIE vol. 2501, 1995, 12 pp.

Guillotel, Philippe, et al.; "Comparison of motion vector coding techniques", SPIE vol. 2308, 1994, 11 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

International Search Report Application No. PCT/US2013/063722 mailed on Dec. 9, 2013.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp. (Abstract only).

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and.Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Mozilla, "Introduction to Video Coding Part 1: Transform Coding", Video Compression Overview, Mar. 2012, 171 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Schwarz et al., "Overview of SVC" IEEE Trans Cir Sys for Vid Tech, Sep. 2007.

Schwarz H. et al.: "SNR-scalable extension of H.264/AVC", Image Processing, 2004. ICIP 2004 International Conference on Singapore Oct. 24-27, 2004.

(56) References Cited

OTHER PUBLICATIONS

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Wiegand, Thomas, et al.; Long-Term Memory Motion-Compensated Prediction, date unknown.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Overview; VP7 Data Format and Decoder. Version 1.5. On2 Technologies, Inc. Dated Mar. 28, 2005.

\* cited by examiner

EDGE-SELECTIVE INTRA CODING

CROSS-REFERENCE TO RELATED APPLICATIONS

This application is a divisional of U.S. patent application Ser. No. 13/647,080 filed on Oct. 8, 2012, which is incorporated herein by reference in its entirety.

TECHNICAL FIELD

This disclosure relates to video encoding and decoding.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

Implementations of systems, methods, and apparatuses for encoding and decoding a video signal using edge-selective intra coding are disclosed herein. One aspect of the disclosed implementations is a method of edge-selective intra coding, which may include generating a first encoded block by encoding a first input block from a first input frame from an input video stream, generating a first reconstructed block by decoding the first encoded block, determining a reconstruction error block based on a difference between the first input block and the first reconstructed block, identifying a second input block from the first input frame, and determining a plurality of refined context pixels. Determining a plurality of refined context pixels may include identifying a plurality of context pixels from the reconstruction error block, generating a plurality of encoded context pixels by encoding the plurality of context pixels, generating a plurality of reconstructed context pixels by decoding the plurality of encoded context pixels, and adding at least a portion of the reconstruction error block and the plurality of reconstructed context pixels. Edge-selective intra coding may include generating, by a processor in response to instructions stored on a non-transitory computer readable medium, a second encoded block by encoding the second input block based on the plurality of refined context pixels, including the second encoded block in an output bitstream, and transmitting or storing the output bitstream.

Another aspect of the disclosed implementations is a method of edge-selective intra coding, which may include identifying a first input block from a first input frame from an input video stream, and generating a first encoded block by identifying a prediction block based on the first input block, generating a residual block based on a difference between the first input block and the prediction block, generating a transform block by transforming the residual block, the transform block including a plurality of transform coefficients, and generating a quantized block by quantizing the transform block using a transform domain quantization value. Edge-selective intra coding may include generating a first reconstructed block by decoding the first encoded block, determining a reconstruction error block based on a difference between the first input block and the first reconstructed block, identifying a second input block from the first input frame, and determining a plurality of refined context pixels. Determining a plurality of refined context pixels may include identifying a plurality of context pixels from the reconstruction error block, generating a plurality of encoded context pixels by quantizing the plurality of context pixels using a spatial domain quantization value, generating a plurality of reconstructed context pixels by decoding the plurality of encoded context pixels, and adding at least a portion of the reconstruction error block and the plurality of reconstructed context pixels. Edge-selective intra coding may include generating, by a processor in response to instructions stored on a non-transitory computer readable medium, a second encoded block by encoding the second input block based on the plurality of refined context pixels, including the second encoded block in an output bitstream, and transmitting or storing the output bitstream.

Another aspect of the disclosed implementations is a method of edge-selective intra coding, which may include identifying a current input block from a first input frame from an input video stream, generating, by a processor in response to instructions stored on a non-transitory computer readable medium, a current encoded block by encoding the current input block, wherein encoding the current input block includes identifying a prediction block based on the current input block and a plurality of refined context pixels, including the current encoded block in an output bitstream, and transmitting or storing the output bitstream Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes, including, for example, remote business meetings via video conferencing, high definition video entertainment, video advertisements, or sharing of user-generated videos. Video encoding and decoding (codec) can use various compression schemes. These compression schemes may include breaking a video image into blocks and generating a digital video output bitstream using one or more techniques to limit the information included in the output. A received bitstream can be decoded to re-create the blocks and the source images from the limited information.

Encoding a video stream, or a portion thereof, such as a frame or a block, can include using temporal and spatial similarities in the video stream to improve coding efficiency. For example, a current block of the video stream may be encoded based on a previously encoded block in the video stream by predicting motion and color information for the current block and identifying a difference (residual) between the predicted values and the current block.

Intra prediction uses video data that has been previously encoded and reconstructed to predict the current block in the same frame. Intra prediction can be used to intra code the current block: the prediction block can be deducted from the current block and the difference, i.e., the residual, can be transformed, quantized and entropy encoded to be included in a compressed video stream.

In some instances, prediction error introduced by various stages of intra coding (e.g., transformation and/or quantization) can be very large, which may affect prediction accuracy of subsequent blocks and lead to suboptimal overall coding performance. In some implementations of this disclosure, intra coding for the current block can include performing a transform domain coding for all pixels in the current block and a spatial domain coding for selected pixels. The pixels selected for the spatial domain coding can be based on, for example, pixels that are likely to be used for predicting other blocks in the same frame. Using the selected pixels to reinforce the intra coding allows a more accurate intra prediction while maintaining a high compression ratio for the video stream.

For example, the current block can be encoded using a first encoding technique, which can include transforming the residual and applying a first quantization parameter to the transform coefficients. A first block can be reconstructed from the quantized transform coefficients. A residual error block can be determined based on a difference between the current block and the first block. A portion of the residual error block, such as the right-most column and the bottom-most row of pixels, can be identified and encoded using a second encoding technique, which can include applying a second quantization parameter to the portion of the residual error block. The portion of the residual error block can be reconstructed and added to the first block to determine a second block. Since the second block is reinforced from the first block with better precision at the portion (e.g., edges) that is likely to be used for intra predicting of other blocks, the prediction results will be more accurate when the second block is used to predict other blocks in the frame.

Figure 1:
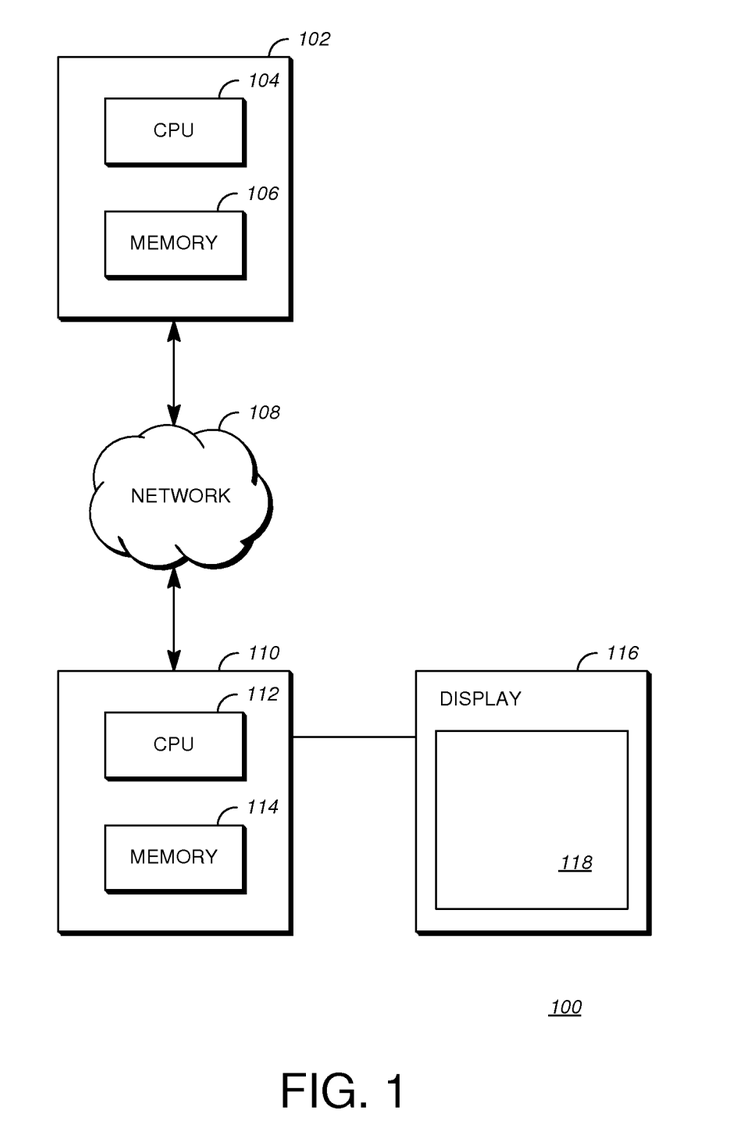
FIG. 1 is a schematic of a video encoding and decoding system in accordance with implementations of this disclosure.

These and other examples are now described with reference to the accompanying drawings. FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. CPU 104 is a controller for controlling the operations of transmitting station 102. CPU 104 can be connected to the memory 106 by, for example, a memory bus. Memory 106 can be read only memory (ROM), random access memory (RAM) or any other suitable memory device. Memory 106 can store data and program instructions that are used by CPU 104. Other suitable implementations of transmitting station 102 are possible. For example, the processing of transmitting station 102 can be distributed among multiple devices.

A network 108 connects transmitting station 102 and a receiving station 110 for encoding and decoding of the video stream. Specifically, the video stream can be encoded in transmitting station 102 and the encoded video stream can be decoded in receiving station 110. Network 108 can be, for example, the Internet. Network 108 can also be a local area network (LAN), wide area network (WAN), virtual private network (VPN), a cellular telephone network or any other means of transferring the video stream from transmitting station 102 to, in this example, receiving station 110.

Receiving station 110 can, in one example, be a computer having an internal configuration of hardware including a processor such as a CPU 112 and a memory 114. CPU 112 is a controller for controlling the operations of receiving station 110. CPU 112 can be connected to memory 114 by, for example, a memory bus. Memory 114 can be ROM, RAM or any other suitable memory device. Memory 114 can store data and program instructions that are used by CPU 112. Other suitable implementations of receiving station 110 are possible. For example, the processing of receiving station 110 can be distributed among multiple devices.

A display 116 configured to display a video stream can be connected to receiving station 110. Display 116 can be implemented in various ways, including by a liquid crystal display (LCD), a cathode-ray tube (CRT), or a light emitting diode display (LED), such as an OLED display. Display 116 is coupled to CPU 112 and can be configured to display a rendering 118 of the video stream decoded in receiving station 110.

Other implementations of the encoder and decoder system 100 are also possible. For example, one implementation can omit network 108 and/or display 116. In another implementation, a video stream can be encoded and then stored for transmission at a later time by receiving station 110 or any other device having memory. In one implementation, receiving station 110 receives (e.g., via network 108, a computer bus, or some communication pathway) the encoded video stream and stores the video stream for later decoding. In another implementation, additional components can be added to the encoder and decoder system 100. For example, a display or a video camera can be attached to transmitting station 102 to capture the video stream to be encoded.

Figure 2:
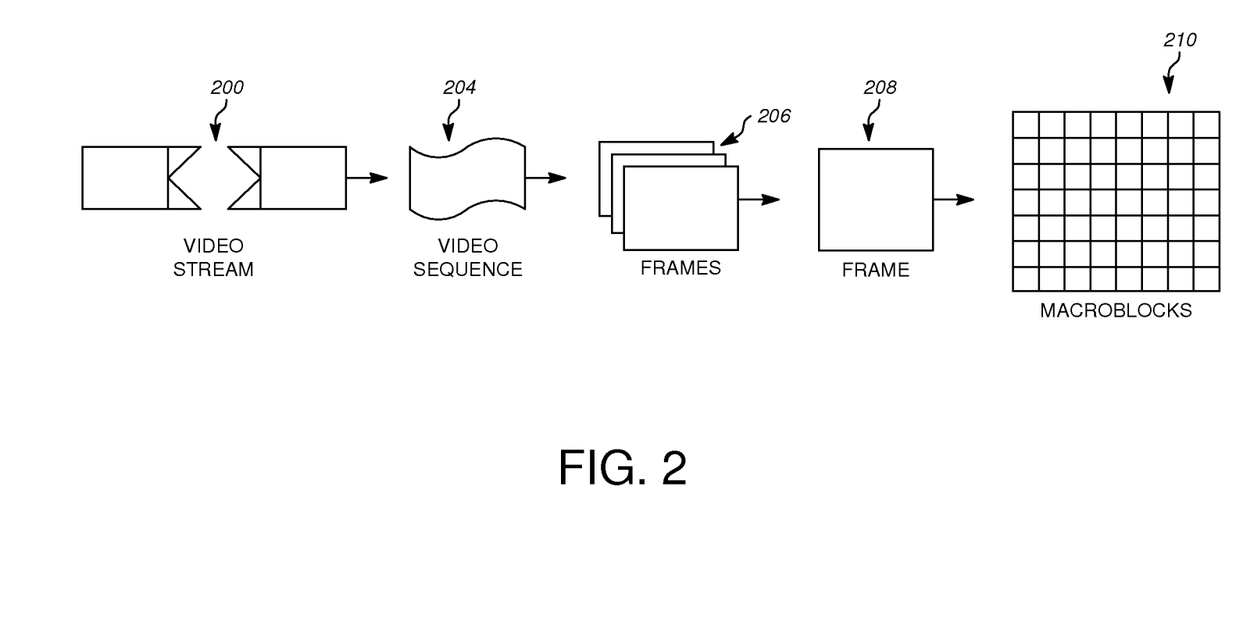
FIG. 2 is a diagram of an example video stream to be encoded and decoded in accordance with implementations of this disclosure.

FIG. 2 is a diagram of an example video stream 200 to be encoded and decoded. Video stream 200 (also referred to herein as video data) includes a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into individual frames, e.g., a single frame 208. Each frame 208 can capture a scene with one or more objects, such as people, background elements, graphics, text, a blank wall, or any other information.

At the next level, single frame 208 can be divided into a set of blocks 210, which can contain data corresponding to, in some of the examples described below, a 4×4 pixel group in frame 208. Block 210 can also be of any other suitable size such as a block of 16×8 pixels, a block of 8×8 pixels, a block of 16×16 pixels or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
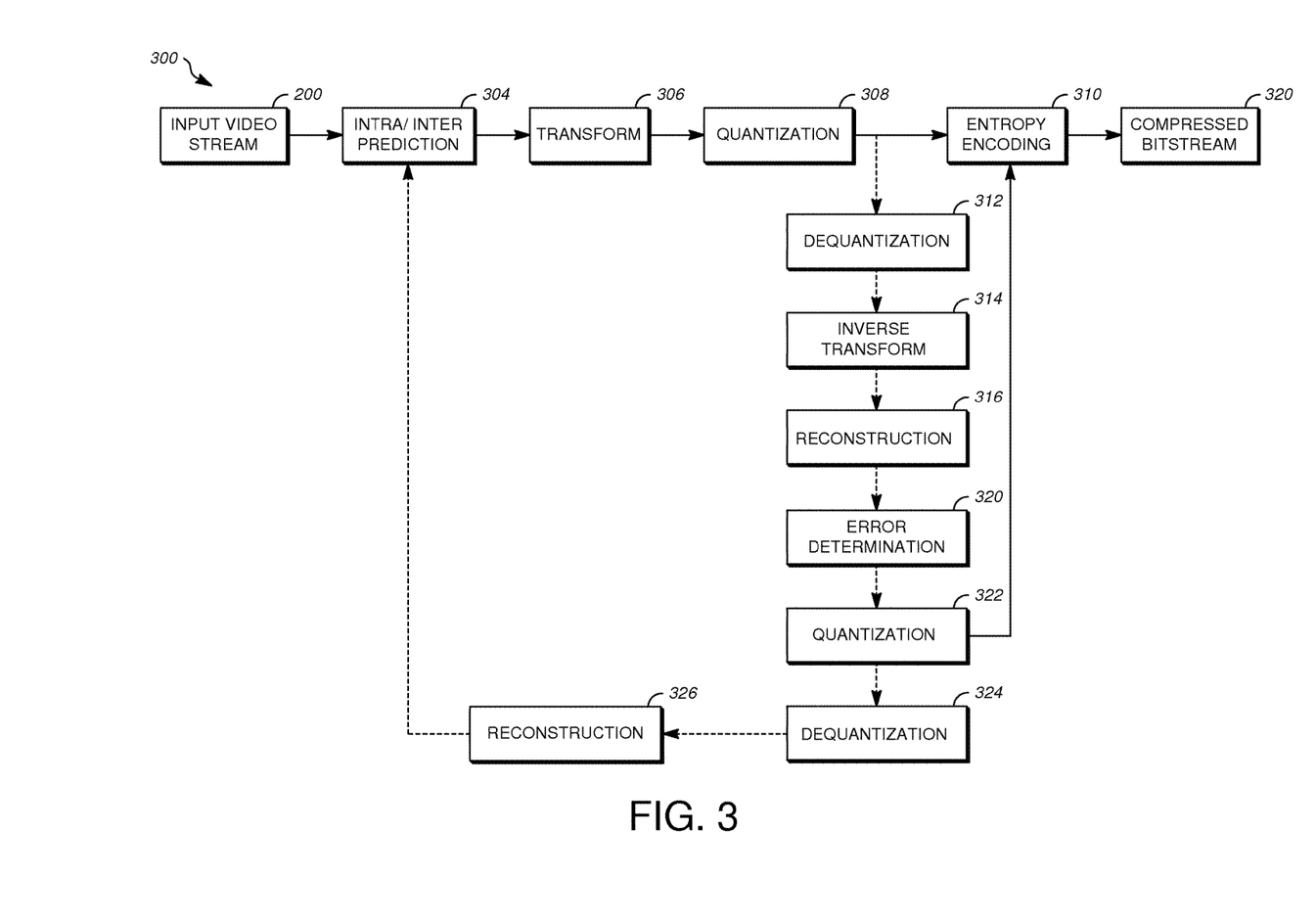
FIG. 3 is a block diagram of a video compression system in accordance with implementations of this disclosure.

FIG. 3 is a block diagram of an encoder 300 in accordance with one implementation. Encoder 300 can be implemented, as described above, in transmitting station 102 such as by providing a computer software program stored in memory 106, for example. The computer software program can include machine instructions that, when executed by CPU 104, cause transmitting station 102 to encode video data in the manner described in FIG. 3. Encoder 300 can also be implemented as specialized hardware in, for example, transmitting station 102. Encoder 300 has the following stages to perform the various functions in a forward path (shown by the solid connection lines) to produce an encoded or a compressed bitstream 320 using input video stream 200: an intra/inter prediction stage 304, a transform stage 306, a quantization stage 308, and an entropy encoding stage 310. Encoder 300 may include a reconstruction path (shown by the dotted connection lines) to reconstruct a frame for encoding of future blocks. In FIG. 3, encoder 300 has the following stages to perform the various functions in the reconstruction path: a dequantization stage 312, an inverse transform stage 314, a reconstruction stage 316, and a loop filtering stage (not shown). In some implementations of this disclosure, encoder 300 can further include one or more additional stages: an error determination stage 320, a (second) quantization stage 322, a (second) dequantization stage 324, and a (second) reconstruction stage 326. Dequantization stage 312, inverse transform stage 314 and reconstruction stage 316 are referred to herein as first round reconstruction stages, while dequantization stage 324 and reconstruction stage 326 are referred to as second round reconstruction stages. Other structural variations of encoder 300 can also be used to encode video stream 200.

When video stream 200 is presented for encoding, each frame 208 within video stream 200 can be processed in units of blocks. Referring to FIG. 3, at intra/inter prediction stage 304, each block can be encoded using either intra prediction (i.e., within a single frame) or inter prediction (i.e. from frame to frame). In either case, a prediction block can be formed. The prediction block is then subtracted from the block of transform coefficients to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames.

The prediction block is then subtracted from the block of transform coefficients; the difference, i.e., the residual is then encoded and transmitted to decoders. Image or video codecs may support many different intra and inter prediction modes; each image block can use one of the prediction modes to provide a prediction block that is most similar to the block of transform coefficients to minimize the information to be encoded in the residual. The prediction mode for each block of transform coefficients can also be encoded and transmitted, so a decoder can use same prediction mode(s) to form prediction blocks in the decoding and reconstruction process.

The prediction mode can be selected from one of multiple intra-prediction modes defined in video standards such as H.264, VPx and HEVC. The multiple intra-prediction modes can include, for example, DC prediction mode, horizontal prediction mode, vertical prediction mode, and true motion prediction mode (which can also be referred to as TM_PRED). In one implementation of DC prediction mode, a single value using the average of the pixels in a row above a current block and a column to the left of the current block can be used to predict the current block. In one implementation of horizontal prediction, each column of a current block can be filled with a copy of a column to the left of the current block. In one implementation of vertical prediction, each row of a current block can be filled with a copy of a row above the current block. In one implementation of TrueMotion prediction, in addition to the row above the current block and the column to the left of the current block, TM_PRED uses the pixel P above and to the left of the block. Horizontal differences between pixels in the row above the current block (starting from P) are propagated using the pixels from the column to the left of the current block to start each row. Other intra-prediction modes can also be used.

The prediction mode can also be selected from one of multiple inter-prediction modes including, for example, golden frame prediction mode, last frame prediction mode, alternative reference frame prediction mode, or any other prediction mode using any reference frame in an encoding scheme. In one implementation of the last frame prediction mode, the current block can be predicted by using the blocks in the immediate previous frame. In one implementation of the golden frame prediction mode, the current block can be predicted by using blocks in a golden frame selected from an arbitrarily distant past of the video stream. The golden frame is usually coded at a higher than average quality. In one implementation of the alternative reference frame prediction mode, an alternative reference frame constructed from multiple source frames of the video data can be used to predict the current block. When an inter-prediction mode is selected, a motion vector can also be encoded, which describes the position of the prediction block relative to the current block (e.g., offsets of the coordinates).

Next, still referring to FIG. 3, transform stage 306 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), and the Singular Value Decomposition Transform (SVD). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix. In some implementations, the set of transform coefficients can be determined using, for example, a two-dimensional transform and can be arranged in, for example, a 4×4 block of transform coefficients.

Quantization stage 308 converts the transform coefficients into discrete quantum values, which are referred to as quantized transform coefficients, using a quantizer value or quantization levels. The quantized transform coefficients are then entropy encoded by entropy encoding stage 310. The entropy-encoded coefficients, together with other information used to decode the block, which can include for example the type of prediction used, motion vectors, and quantization value, are then output to compressed bitstream 320. Compressed bitstream 320 can be formatted using various techniques, such as variable length encoding (VLC) and arithmetic coding. Compressed bitstream 320 can also be referred to as an encoded video stream and the terms will be used interchangeably herein.

The reconstruction path in FIG. 3 (shown by the dotted connection lines) can be used to provide both encoder 300 and a decoder 400 (described below) with the same reference frames to decode compressed bitstream 320. The reconstruction path performs functions that are similar to functions that take place during the decoding process that are discussed in more detail below, including dequantizing the quantized transform coefficients at dequantization stage 312 to generate dequantized transform coefficients and inverse transforming the dequantized transform coefficients at inverse transform stage 314 to produce a derivative residual block (i.e., derivative residual). At reconstruction stage 316, the prediction block that was predicted at intra/inter prediction stage 304 can be added to the derivative residual to create a reconstructed block. In some implementations, loop filtering stage can be applied to the reconstructed block to reduce distortion such as blocking artifacts.

In some implementations of this disclosure, the reconstructed block (also referred to as the first block) at stage 316 can be used to determine a residual error block at error determination stage 320 by determining the difference of the reconstructed block and the original block. A portion of the residual error block can be quantized at quantization stage 322. The quantized portion of the residual error block can be entropy coded at stage 310 and become part of the compressed bitstream 320.

In some implementations of this disclosure, the quantized portion of the residual error block can be dequantized at dequantization stage 324 and used for determining a second block at reconstruction stage 326. The second reconstructed block can be produced by, for example, adding the dequantized residual error values from stage 324 to the first block. The second block can be used to predict other blocks in the frame 208.

Other variations of encoder 300 can be used to encode compressed bitstream 320. For example, a non-transform based encoder 300 can quantize the residual block directly without transform stage 304. In another implementation, an encoder 300 can have quantization stage 308 and dequantization stage 312 combined into a single stage. In another implementation, quantization stages 308 and 322 can be combined into a single stage.

Figure 4:
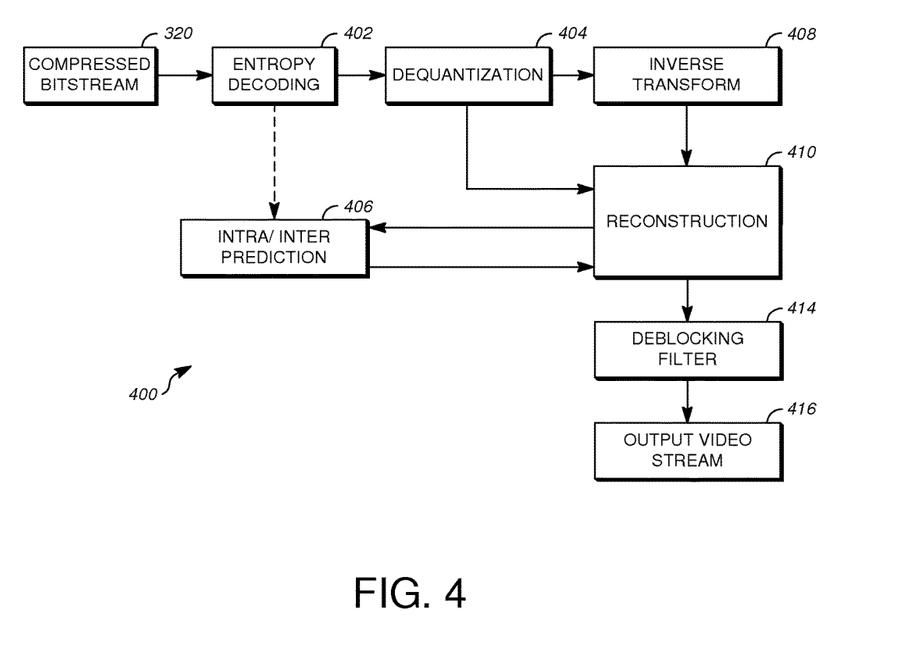
FIG. 4 is a block diagram of a video decompression system in accordance with implementations of this disclosure.

FIG. 4 is a block diagram of a decoder 400 in accordance with another implementation. Decoder 400 can be implemented, for example, in receiving station 110, such as by providing a computer software program stored in memory for example. The computer software program can include machine instructions that, when executed by CPU 112, cause receiving station 110 to decode video data in the manner described in FIG. 4. Decoder 400 can also be implemented as specialized hardware in, for example, transmitting station 102 or receiving station 110.

Decoder 400, similar to the reconstruction path of encoder 300 discussed above, includes in one example the following stages to perform various functions to produce an output video stream 416 from compressed bitstream 320: an entropy decoding stage 402, a dequantization stage 404, an inverse transform stage 408, an intra/inter prediction stage 406, a reconstruction stage 410, a loop filtering stage (not shown), and a deblocking filtering stage 414. Other structural variations of decoder 400 can be used to decode compressed bitstream 320.

When compressed bitstream 320 is presented for decoding, the data elements within compressed bitstream 320 can be decoded by the entropy decoding stage 402 (using, for example, the entropy coding techniques used by encoder 300) to produce a set of quantized transform coefficients. Dequantization stage 404 dequantizes the quantized transform coefficients and inverse transform stage 408 inverse transforms the dequantized transform coefficients to produce a derivative residual that can be identical to that created by reconstruction stage 316 in encoder 300.

In some implementations of this disclosure, a set of untransformed quantized coefficients, which can be derived from the quantized portion of the residual error block at stage 322 of encoder 300, can also be decoded within compressed bitstream 320, and dequantized at dequantization stage 404 to produce a set of dequantized residual error values.

Using header information decoded from compressed bitstream 320, decoder 400 can use intra/inter prediction stage 406 to create the same prediction block as was created in encoder 300, e.g., at intra/inter prediction stage 304. At reconstruction stage 410, the prediction block can be added to the derivative residual to create a reconstructed block that can be identical to the block created by reconstruction stage 316 in encoder 300.

In some implementations of this disclosure, the set of dequantized residual error values can be added to the reconstructed block at reconstruction stage 410 to create a reconstructed block that can be identical to the block created by reconstruction stage 326 in encoder 300.

In some implementations, loop filtering stage (not shown) can be applied to the reconstructed block to reduce artifacts. In some implementations, deblocking filtering stage 414 can be applied to the reconstructed block to reduce blocking distortion, and the result is output as output video stream 416. Output video stream 416 can also be referred to as a decoded video stream and the terms will be used interchangeably herein.

Other variations of decoder 400 can be used to decode compressed bitstream 320. For example, decoder 400 can produce output video stream 416 without deblocking filtering stage 414.

Figure 5:
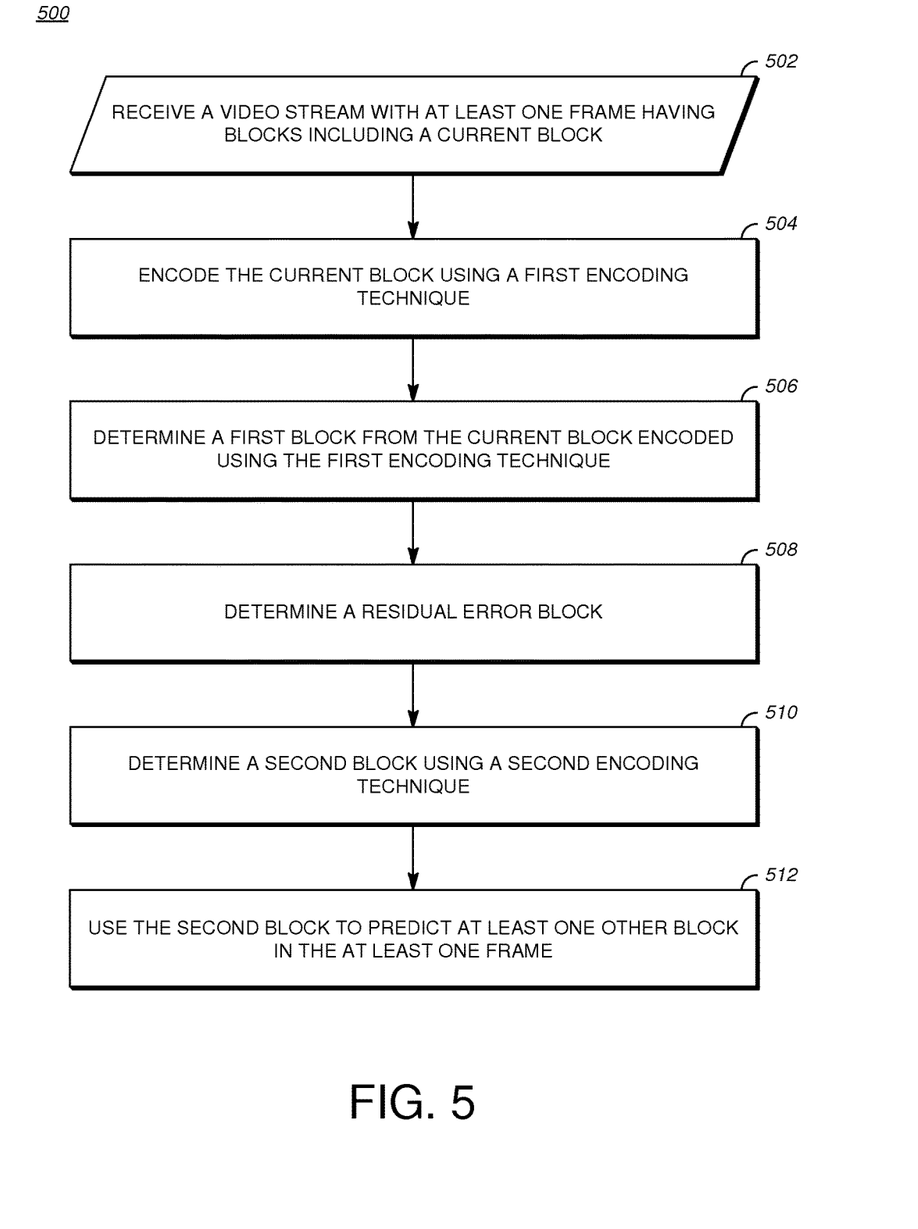
FIG. 5 is a flow diagram of an example method of operation for encoding a video stream using edge-selective intra coding in accordance with implementations of this disclosure.

FIG. 5 is a flowchart showing an example method of operation 500 for encoding a video stream using edge-selective intra coding in accordance with implementations of this disclosure. Method of operation 500 can be implemented in an encoder such as encoder 300 (shown in FIG. 3) and can be implemented, for example, as a software program that can be executed by computing devices such as transmitting station 102 or receiving station 110 (shown in FIG. 1). For example, the software program can include machine-readable instructions that can be stored in a memory such as memory 106 or memory 114, and that can be executed by a processor, such as CPU 104, to cause the computing device to perform method of operation 500.

Method of operation 500 can be implemented using specialized hardware or firmware. Some computing devices can have multiple memories, multiple processors, or both. The steps of method of operation 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps.

Implementations of method of operation 500 can include, for example, receiving a frame of a video stream having blocks including a current block at a step 502, encoding the current block using a first encoding technique at a step 504; determining a first block at a step 506; determining a residual error block at a step 508; determining a second block using a second encoding technique at a step 510; using the second block for predicting at least one other block in the frame at a step 512; or any combination of the steps 502-512.

At step 502, a frame of a video stream (also referred to herein as video data) having multiple blocks, including a current block, can be received by a computing device, such as transmitting station 102. Received, as used herein, includes acquired, obtained, read in any manner whatsoever. The video data or stream can be received in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device.

At step 504, the current block can be encoded using a first encoding technique.

In some implementations, the current block can be predicted using an intra prediction mode. The intra prediction mode can be selected for the current block at, for example, inter/intra prediction stage 304 of FIG. 3. Data available for use during intra prediction can include pixel values that have been previously coded and reconstructed. In some codec schemes, such as the schemes that use raster scanned coding, data available for use during intra prediction can include data from previously coded blocks in the same frame, such as the block immediately above the current block and the block to the left of the current block in the same row. Based on the prediction mode selected for the current block, a residual block (also referred to as residual) can be determined for the current block, which can be transformed and quantized.

In some implementations, encoding the current block using the first encoding technique can include determining a set of transform coefficients for the residual of the current block (e.g., at transform stage 306 of encoder 300 in FIG. 3), quantizing the set of transform coefficients (e.g., at quantization stage 308 of FIG. 3), entropy coding the set of quantized transform coefficients (e.g., at entropy coding stage 310 of FIG. 3), or a combination thereof. The set of transform coefficients can be quantized using a first quantization parameter. When transformation and/or quantization stage is applied, the first encoding technique can be lossy.

At step 506, a first block can be determined from the current block encoded using the first encoding technique. For example, the first block can be determined from the quantized transform coefficients from quantization stage 308. In some implementations, the first block can be a reconstructed block determined using first round reconstruction stages in FIG. 3, such as dequantization stage 312, inverse transform stage 314, reconstruction stage 316, or a combination thereof. In other implementations, the first block can be a reconstructed residual block determined using first round reconstruction stages such as dequantization stage 312, inverse transform stage 314, or both.

At step 508, a residual error block can be determined based on the current block and the first block. For example, the residual error block can be determined based on a difference between the current block and the first block. When the first block is implemented as a reconstructed block, the residual error block can be determined as a block of pixel-by-pixel difference values between the current block and the first block. When the first block is implemented as a reconstructed residual block, the residual error block can be determined as a block of pixel-by-pixel difference values between the residual block and the first block. Step 508 can be implemented at, for example, error determination stage 320 of FIG. 3.

At step 510, a second block can be determined using a second encoding technique. The second block can be determined based on the first block and at least a portion of the residual error block. For example, the portion of the residual error block can include a right-most column or a bottom-most row of the residual error block, or both. The portion of the residual error block can be selected based on, for example, the intra prediction mode used for predicting the current block. For example, if the intra prediction mode is the horizontal prediction mode, the right-most column of the residual error block can be selected, because this column will likely be used for predicting the block to the right of the current block using the same prediction mode.

In some implementations, the portion of the residual error block can be quantized using a second quantization parameter (e.g., at quantization stage 322 of FIG. 3). The quantized portion of the residual error block can be entropy coded at entropy encoding stage 310 of FIG. 3. In other implementations, the portion of the residual error block may not be quantized. Since the portion of the residual error block need not be transformed, the second encoding technique can be lossy or lossless. For example, the second quantization parameter can be equal to 1 or any other value.

In some implementations, the quantized portion of the residual error block can be used to determine the second block, which can be used for intra prediction of other blocks (e.g., at step 512 below). In other implementations, such as when the portion of the residual error block is not quantized, the portion of the residual error block can be used to determine the second block. For example, the second block can be determined as a sum of the first block and the dequantized residual error values determined at dequantized stage 324. In another example, such as when the portion of the residual error block is not quantized, the second block can be determined as a sum of the first block and the portion of the residual error block.

In some implementations, the second block can be a reconstructed block determined using the second round reconstruction stages in FIG. 3, such as dequantization stage 324, reconstruction stage 326, or both. In other implementations, the second block can be a reconstructed residual block determined using, for example, dequantization stage 324.

At step 512, the second block can be used for predicting at least one other block in the frame. In one example where the horizontal prediction mode is used, the right-most column of the second block can be used to predict the block to the right of the current block. In another example where the vertical prediction mode is used, the bottom-most row of the second block can be used to predict the block below current block. Since the second block is reinforced from the first block with better precision at the portion (e.g., edges)

that is likely to be used for intra predicting of other blocks, the prediction results will be more accurate using the second block.

As discussed above, the first encoding technique can be lossy, which allows more compression of the video stream at a lower data rate. The second encoding technique can be lossless or lossy. For example, the value of the second quantization parameter can be set to be 1, which allows lossless compression for the selected portion of the residual error block. Since the second quantization parameter can be applied in the spatial domain directly (i.e., without transformation), the effect of quantization using the second encoding scheme can be different than the effect of quantization using the first encoding scheme, which is applied in the transform domain. Therefore, setting a suitable quantization parameter for the portion of the residual error block will allow a more accurate prediction for the portion of the current block that is more likely to be used for predicting other blocks in the same frame.

Method of operation 500 is depicted and described as a series of steps. However, steps in accordance with this disclosure can occur in various orders or concurrently. For example, encoding the current block using the first encoding technique at step 504 can occur concurrently with determining the first block at step 506. Additionally, steps in accordance with this disclosure may occur with other steps not presented and described herein. In one example, the second block can be used to select the prediction mode for the next block. Furthermore, not all illustrated steps may be required to implement a method of edge-selective intra coding.

Although not shown in FIG. 5, the encoded video stream 320 can be transmitted, stored, further processed, or a combination thereof. For example, the encoded video stream 320 can be stored in a memory, such as the memory 106 or 114 shown in FIG. 1. The encoded video stream 320 can also be transmitted to a decoder, such as the decoder 400 shown in FIG. 4.

Figure 6:
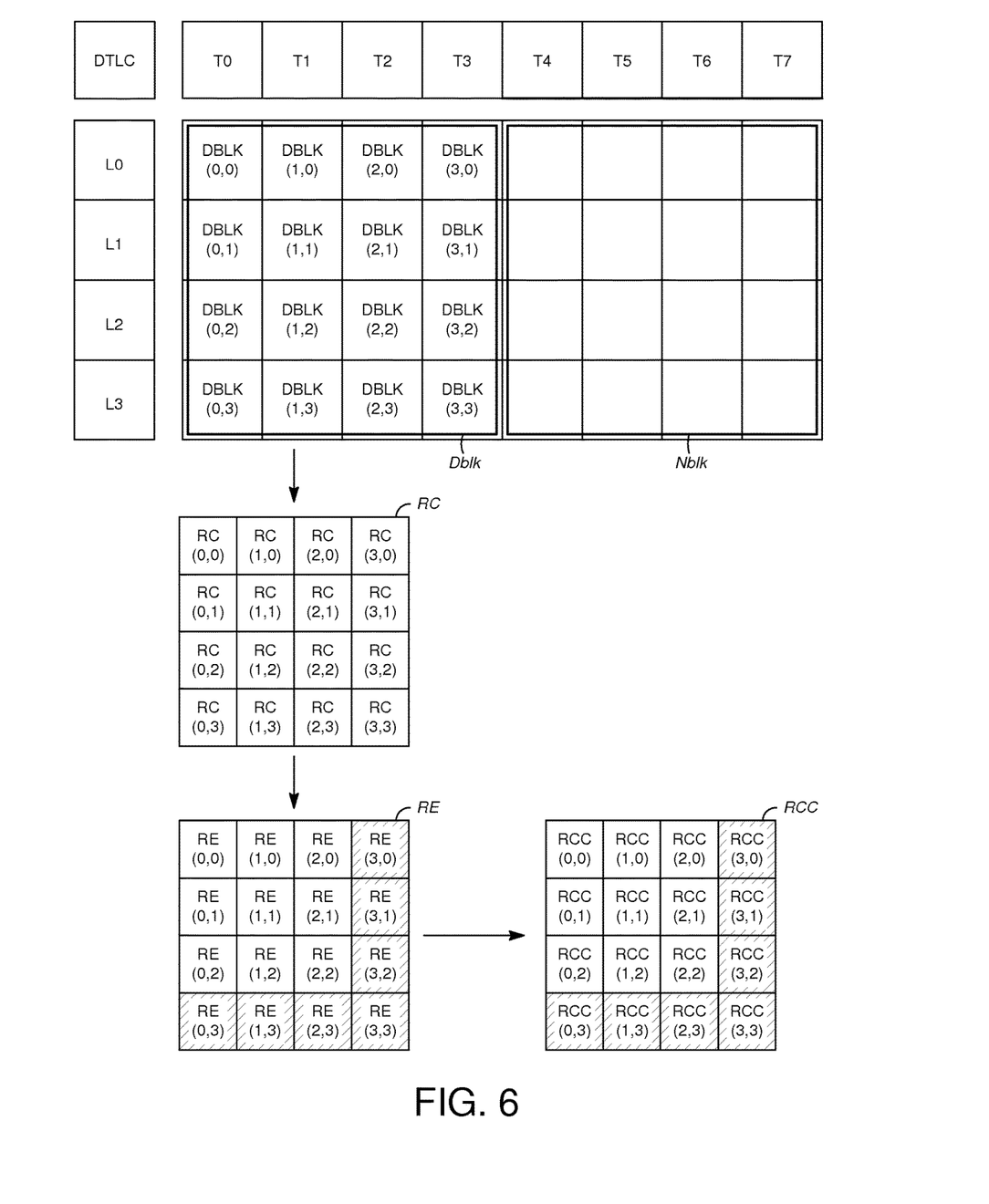
FIG. 6 is a diagram of an example of blocks determined using edge-selective intra coding in accordance with implementations of this disclosure.

FIG. 6 shows a diagram of an example of blocks determined using edge-selective intra coding in accordance with implementations of this disclosure. The blocks can include, for example, a current block Dblk, a first block RC (derived from the current block Dblk), a residual error block RE and a corresponding second block RCC. The current block Dblk can be predicted, transformed, quantized, and/or reconstructed using various encoding stages. In this example, the blocks each have a set of 4×4 pixels, which can be represented by a 4×4 matrix. However, any block size can be used.

The current block can be represented by a 4×4 matrix Dblk as follows:

$$Dblk=[Dblk(i,j)],\ i=0,1,2,3;\ j=0,1,2,3; \quad (1)$$

where Dblk(i,j) is the pixel value for data element (i,j) in Dblk.

A prediction block of the current block can be represented by a 4×4 matrix Pblk as follows:

$$Pblk=[Pblk(i,j)],\ i=0,1,2,3;\ j=0,1,2,3; \quad (2)$$

where Pblk(i,j) is the predicted pixel value for data element (i,j).

A residual block can be represented by a 4×4 residual error matrix Rblk as follows:

$$Rblk=[Rblk(i,j)]=[Dblk(i,j)-Pblk(i,j)],\ i=0,1,2,3;\ j=0,1,2,3; \quad (3)$$

where Rblk(i,j) is the residual value for data element (i,j) in Rblk. In this example, the residual value is the difference of pixel values between Dblk(i,j) of the current block and Pblk(i,j) of the prediction block.

An array DT of 8 pixels can be used to represent the data in a row immediately above the current block as follows:

$$DT=[Ti],\ i=0,1,\ldots 7. \quad (4)$$

An array DL of 4 pixels can be used to represent the data in a column immediately left of the current block as follows:

$$DL=[Lj],\ j=0,1,2,3. \quad (5)$$

In addition, DTLC can be used to represent the pixel above and to the left of the current block. DTLC and arrays DT and DL, which may be previously coded (and reconstructed) pixel values, can be used during intra prediction for predicting the current block.

As seen in FIG. 6, DT, DL, and DTLC, can be used to predict the current block Dblk. For example, DT can include a bottom-most row (T0, T1, T2, T3) reconstructed for the block immediately above the current block Dblk and a bottom-most row (T4, T5, T6, T7) reconstructed for the block to the above-right of the current block Dblk. DL can include a right-most row (L0, L1, L2, L3) reconstructed for the block to the left of the current block Dblk.

As discussed above at step 506, the current block Dblk can be predicted, transformed, quantized, and/or reconstructed using various encoding stages to determine a first block RC. For example, the first block can be a reconstructed block represented by a 4×4 matrix RC as follows:

$$RC=[RC(i,j)],\ i=0,1,2,3;\ j=0,1,2,3; \quad (6)$$

where RC(i,j) is the reconstructed pixel value for data element (i,j) in RC.

The first block RC and the current block Dblk can be used (e.g., at step 508) to determine a residual error block RE. For example, the residual error block can be represented by a 4×4 matrix RE as follows:

$$RE=[RE(i,j)]=[Dblk(i,j)-RC(i,j)],\ i=0,1,2,3;\ j=0,1,2,3; \quad (7)$$

A portion of the residual error block RE can be used to determine a second block RCC. The portion of the residual error block RE (e.g., the shaded portion of block RE in FIG. 6) can include, for example, the right-most column (e.g., RE(3,j), j=0, 1, 2, 3) and the bottom-most row (e.g., RE(i,3), i=0, 1, 2, 3) of block RE.

The second block RCC can be represented by a 4×4 matrix RCC as follows:

$$RCC=[RCC(i,j)],\ i=0,1,2,3;\ j=0,1,2,3; \quad (8)$$

where RCC(i,j)=RC(i,j), i=0, 1, 2, j=0, 1, 2; and RCC(i,j)=RC(i,j)+RE'(i,j), i=3 or j=3. RE'(i,j) can be, for example, reconstructed residual errors derived from RE(i,j).

The second block RCC can be used to predict another block in the same frame, such as block Nblk, which is to the immediate right of the current block Dblk in FIG. 6. For example, when the horizontal prediction mode is used, the right-most column (e.g., RCC(3,j), j=0, 1, 2, 3) of the second block RCC can be used to predict the pixels within block Nblk.

Figure 7:
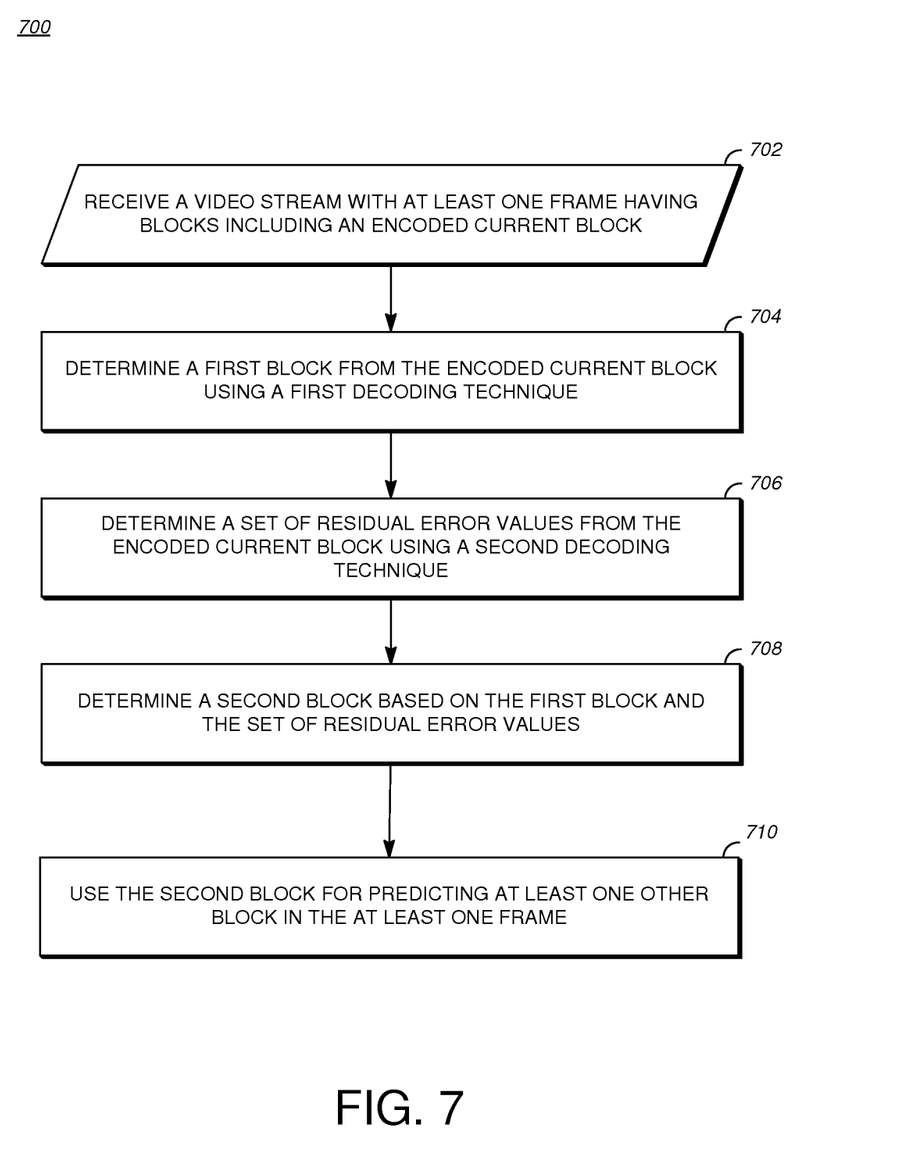
FIG. 7 is a flow diagram of an example method of operation for decoding a video stream using edge-selective intra coding in accordance with implementations of this disclosure.

FIG. 7 is a flowchart of an example method of operation 700 for decoding a video stream using edge-selective intra coding in accordance with implementations of this disclosure. Method of operation 700 can be implemented, for example, as a software program that may be executed by computing devices such as transmitting station 102 or receiving station 110. For example, the software program can include machine-readable instructions that may be stored in a memory such as memory 106 or 114, and that, when executed by a processor, such as CPU 104 or 112, may cause the computing device to perform method of operation 700. Method of operation 700 can be implemented using specialized hardware or firmware. As explained above, some computing devices may have multiple memories or processors, and the steps of method of operation 700 can be distributed using multiple processors, memories, or both.

Implementations of decoding the video stream can include, for example, receiving a video stream with at least one frame having blocks including a encoded current block at a step 702, determining a first block from the encoded current block using a first decoding technique at a step 704, determining a set of residual error values from the encoded current block using a second decoding technique at a step 706, determining a second block based on the first block and the set of residual error values at a step 708, using the second block for predicting at least one other block in the at least one frame at a step 710, or any combination thereof.

At step 702, a computing device such as receiving station 110 may receive an encoded video stream, such as compressed bitstream 320. The encoded video stream (which may be referred to herein as the encoded video data) can be received in any number of ways, such as by receiving the video data over a network, over a cable, or by reading the video data from a primary memory or other storage device, including a disk drive or removable media such as a DVD, CompactFlash (CF) card, Secure Digital (SD) card, or any other device capable of communicating a video stream.

An encoded current block can be identified from a frame in the encoded video stream. The terms "identifies", "identify", or "identified" as used herein include to select, construct, determine, or specify in any manner whatsoever. The encoded current block can be, for example, a block that has been encoded at encoder 300 using method of operation 500.

At step 704, a first block can be determined from the encoded current block using a first decoding technique. The first decoding technique can correspond to the first encoding technique described at step 504.

In some implementations, the first block can be a reconstructed residual block (also referred to as "derivative residual block") decoded from the encoded current block using the first decoding technique, which can include entropy decoding the encoded current block to produce a block of quantized transform coefficients and a set of quantized residual error values (e.g., at entropy decoding stage 402 of FIG. 4), dequantizing the quantized transform coefficients (e.g., at dequantization stage 404 of FIG. 4), inverse transforming the dequantized transform coefficients to produce a derivative residual block (e.g., at inverse transform stage 408 of FIG. 4), or a combination thereof. Dequantizing the quantized transform coefficients can include, for example, using the first quantization parameter described at step 504 to dequantize the quantized transform coefficients.

In other implementations, the first block can be a reconstructed block derived from the derivative residual block described above by adding a prediction block created by intra/inter prediction stage 408 using previously decoded video data.

At step 706, a set of residual error values can be determined from the encoded current block using a second decoding technique. The set of residual error values can correspond to the portion of the residual error block determined at step 508 at encoder 300, which can be encoded and transmitted in the compressed bitstream 320 to decoder 400. For example, the set of residual error values can include the residual error values corresponding to the right-most column and/or the bottom-most row of the residual error block determined at step 508. The set of residual error values can be determined using the second decoding technique, which can include dequantizing the quantized residual error values (e.g., at dequantization stage 404 of FIG. 4) using the second quantization parameter. The second decoding technique can correspond to the second encoding technique described at step 510.

At step 708, a second block can be determined based on the first block and the set of residual error values. For example, the second block can be determined as a sum of the first block and the set of residual error values determined at step 706. The second block can be implemented as a reconstructed block or a reconstructed residual block, depending on the applications.

At step 710, the second block can be used for predicting at least one other block in the frame. In one example, the right-most column of the second block can be used to predict the block to the immediate right of the current block in the same frame. In another example, the bottom-most row of the second block can be used to predict the block immediately below the current block.

A frame can be reconstructed from the derived blocks and the output can be an output video stream, such as the output video stream 416 shown in FIG. 4, and may be referred to as a decoded video stream.

Method of operation 700 is depicted and described as a series of steps. However, steps in accordance with this disclosure can occur in various orders or concurrently. Additionally, steps in accordance with this disclosure may occur with other steps not presented and described herein. Furthermore, not all illustrated steps may be required to implement a method in accordance with the disclosed subject matter.

For example, in some implementations, a set of transformed values and a set of untransformed values can be identified after the encoded current block has been entropy decoded. The set of transformed values can be decoded using the first decoding technique and the set of untransformed values can be decoded using the second decoding technique. A reconstructed block can be determined based on the decoded set of transformed values and the decoded set of untransformed values. The reconstructed block can be used for predicting at least one other block in the frame.

The implementations of encoding and decoding described above illustrate some exemplary encoding and decoding techniques. However, "encoding" and "decoding", as those terms are used herein, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, programmable logic controllers, microcode, microcontrollers, servers, microprocessors, digital signal processors or any other suitable circuit or other information processing device, now existing or hereafter developed. In the claims, the term "processor" should be understood as encompassing any of the foregoing hardware, either singly or in combination. The terms "signal" and "data" are used interchangeably.

Further, in some implementations, for example, the techniques described herein can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

In some implementations, transmitting station 102 and receiving station 110 can, for example, be implemented on computers in a screencasting system. Alternatively, transmitting station 102 can be implemented on a server and receiving station 110 or 40 can be implemented on a device separate from the server, such as a hand-held communications device (i.e. a cell phone). In this instance, transmitting station 102 can encode content using an encoder 300 into an encoded video signal and transmit the encoded video signal to the communications device. In turn, the communications device can then decode the encoded video signal using a decoder 400. Alternatively, the communications device can decode content stored locally on the communications device, i.e. content that was not transmitted by transmitting station 102. Other suitable transmitting station 102 and receiving station 110 implementation schemes are available. For example, receiving station 110 can be a generally stationary personal computer rather than a portable communications device and/or a device including an encoder 300 may also include a decoder 400.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. A method comprising:
    generating a first encoded block by encoding a first input block from a first input frame from an input video stream;
    generating a first reconstructed block by decoding the first encoded block;
    determining a reconstruction error block based on a difference between the first input block and the first reconstructed block;
    identifying a second input block from the first input frame;
    determining a plurality of refined context pixels by:
        identifying a plurality of context pixels from the reconstruction error block,
        generating a plurality of encoded context pixels by encoding the plurality of context pixels,
        generating a plurality of reconstructed context pixels by decoding the plurality of encoded context pixels, and
        adding at least a portion of the reconstruction error block and the plurality of reconstructed context pixels;
    generating, by a processor in response to instructions stored on a non-transitory computer readable medium, a second encoded block by encoding the second input block based on the plurality of refined context pixels;
    including the second encoded block in an output bitstream; and
    transmitting or storing the output bitstream.

2. The method of claim 1, wherein encoding the first input block includes:
    identifying a prediction block based on the first input block;
    generating a residual block based on a difference between the first input block and the prediction block;
    determining a transform block by transforming the residual block, the transform block including a plurality of transform coefficients; and
    generating a quantized block by quantizing the transform block.

3. The method of claim 2, wherein decoding the first encoded block includes:
    generating a dequantized block by dequantizing the quantized block;
    generating an inverse-transform block by inverse-transforming the dequantized block; and
    generating the reconstructed block based on a sum of the inverse-transform block and the prediction block.

4. The method of claim 1, wherein encoding the plurality of context pixels includes:
    generating a plurality of quantized context pixels by quantizing the plurality of context pixels.

5. The method of claim 4, wherein decoding the plurality of encoded context pixels includes:
    dequantizing the plurality of quantized context pixels.

6. The method of claim 1, wherein encoding the first input block includes intra-prediction coding the first input block.

7. The method of claim 1, wherein encoding the first input block includes using a first quantization value and encoding the plurality of context pixels includes using a second quantization value.

8. The method of claim 1, wherein encoding the first input block includes using transform domain quantization and encoding the plurality of context pixels includes using spatial domain quantization.

9. The method of claim 1, wherein identifying the plurality of context pixels includes:

identifying the right most column of the reconstruction error block as the plurality of context pixels, on a condition that encoding the first input block includes using horizontal intra prediction; and identifying the bottom most row of the reconstruction error block as the plurality of context pixels, on a condition that encoding the first input block includes using vertical intra prediction.

10. The method of claim 1, wherein encoding the second input block include intra-coding the second input block.

11. A method comprising:

identifying a first input block from a first input frame from an input video stream;

generating a first encoded block by:
    identifying a prediction block based on the first input block,
    generating a residual block based on a difference between the first input block and the prediction block,
    generating a transform block by transforming the residual block, the transform block including a plurality of transform coefficients, and
    generating a quantized block by quantizing the transform block using a transform domain quantization value;

generating a first reconstructed block by decoding the first encoded block;

determining a reconstruction error block based on a difference between the first input block and the first reconstructed block;

identifying a second input block from the first input frame;

determining a plurality of refined context pixels by:
    identifying a plurality of context pixels from the reconstruction error block,
    generating a plurality of encoded context pixels by quantizing the plurality of context pixels using a spatial domain quantization value,
    generating a plurality of reconstructed context pixels by decoding the plurality of encoded context pixels, and
    adding at least a portion of the reconstruction error block and the plurality of reconstructed context pixels;

generating, by a processor in response to instructions stored on a non-transitory computer readable medium, a second encoded block by encoding the second input block based on the plurality of refined context pixels;

including the second encoded block in an output bitstream; and transmitting or storing the output bitstream.

12. The method of claim 11, wherein decoding the first encoded block includes:
    generating a dequantized block by dequantizing the quantized block;
    generating an inverse-transform block by inverse-transforming the dequantized block; and
    generating the reconstructed block based on a sum of the inverse-transform block and the prediction block.

13. The method of claim 11, wherein decoding the plurality of encoded context pixels includes:
    dequantizing the plurality of quantized context pixels.

14. The method of claim 11, wherein encoding the first input block includes intra-prediction coding the first input block.

15. The method of claim 11, wherein identifying the plurality of context pixels includes:
    identifying the right most column of the reconstruction error block as the plurality of context pixels, on a condition that encoding the first input block includes using horizontal intra prediction; and
    identifying the bottom most row of the reconstruction error block as the plurality of context pixels, on a condition that encoding the first input block includes using vertical intra prediction.

16. The method of claim 11, wherein encoding the second input block include intra-coding the second input block.

17. A method comprising:

identifying a current input block from a first input frame from an input video stream;

generating, by a processor in response to instructions stored on a non-transitory computer readable medium, a current encoded block by encoding the current input block, wherein encoding the current input block includes identifying a prediction block based on the current input block and a plurality of refined context pixels;

including the current encoded block in an output bitstream; and transmitting or storing the output bitstream.

18. The method of claim 17, identifying the prediction block includes:
    generating a reconstructed block by decoding an encoded block;
    generating a reconstruction error block for the reconstructed block;
    identifying a plurality of context pixels from the reconstruction error block;
    generating a plurality of encoded context pixels by encoding the plurality of context pixels;
    generating a plurality of reconstructed context pixels by decoding the plurality of encoded context pixels; and
    identifying the plurality of refined context pixels by adding at least a portion of the reconstruction error block and the plurality of reconstructed context pixels.

19. The method of claim 18, wherein decoding the encoded block includes using a transform domain quantization value and decoding the plurality of encoded context pixels includes using a spatial domain quantization value.

20. The method of claim 18, wherein identifying the plurality of context pixels includes:
    identifying the right most column of the reconstruction error block as the plurality of context pixels, on a condition that encoding the first input block includes using horizontal intra prediction; and
    identifying the bottom most row of the reconstruction error block as the plurality of context pixels, on a condition that encoding the first input block includes using vertical intra prediction.

* * * * *